(12) United States Patent
Han et al.

(10) Patent No.: US 11,745,803 B2
(45) Date of Patent: Sep. 5, 2023

(54) REAR QUARTER VEHICLE BODY AND ASSEMBLING METHOD FOR THE SAME

(71) Applicants: Hyundai Motor Company, Seoul (KR); Kia Corporation, Seoul (KR)

(72) Inventors: Yoonkyoung Han, Suwon-si (KR); Joonghyun Shin, Hwaseong-si (KR); Minsoo Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 24 days.

(21) Appl. No.: 17/643,043

(22) Filed: Dec. 7, 2021

(65) Prior Publication Data

US 2022/0355867 A1 Nov. 10, 2022

(30) Foreign Application Priority Data

May 6, 2021 (KR) .......................... 10-2021-0058781

(51) Int. Cl.
*B62D 25/04* (2006.01)
*B62D 27/02* (2006.01)
*B62D 25/02* (2006.01)
*B62D 25/06* (2006.01)
*B62D 25/08* (2006.01)

(52) U.S. Cl.
CPC .......... *B62D 25/025* (2013.01); *B62D 25/04* (2013.01); *B62D 25/06* (2013.01); *B62D 25/08* (2013.01); *B62D 27/023* (2013.01)

(58) Field of Classification Search
CPC ........ B62D 25/04; B62D 25/06; B62D 25/02; B62D 25/08; B62D 27/023; B62D 27/026
USPC .............. 296/203.01, 203.04, 193.08, 29, 30
See application file for complete search history.

(56) References Cited

U.S. PATENT DOCUMENTS

| | | | | |
|---|---|---|---|---|
| 4,775,181 A | * | 10/1988 | Shoda | B62D 25/06 296/213 |
| 7,954,886 B2 | * | 6/2011 | Kinoshita | B62D 25/06 296/193.06 |
| 9,022,458 B2 | * | 5/2015 | Hasegawa | B62D 29/043 296/193.06 |
| 9,487,240 B2 | * | 11/2016 | Kisaku | B62D 25/087 |
| 10,889,329 B2 | | 1/2021 | Kamimura et al. | |
| 2016/0221610 A1 | | 8/2016 | Nishimura et al. | |

FOREIGN PATENT DOCUMENTS

| | | |
|---|---|---|
| JP | 6103142 B2 | 4/2017 |
| JP | 2019142348 A | 8/2019 |
| KR | 100521927 B1 | 10/2005 |

\* cited by examiner

*Primary Examiner* — Dennis H Redder
(74) *Attorney, Agent, or Firm* — Slater Matsil, LLP

(57) ABSTRACT

In an embodiment a rear quarter vehicle body structure includes a quarter complete including a quarter pillar upper reinforcement and a quarter complete outer welding surface formed at an outside of a vehicle body and a side outer rear extension assembly including a side outer rear extension having a rear extension outer flange formed at the outside of the vehicle body, wherein an inner surface of the rear extension outer flange is joined to the quarter complete outer welding surface.

10 Claims, 9 Drawing Sheets

REAR QUARTER VEHICLE BODY AND ASSEMBLING METHOD FOR THE SAME

CROSS-REFERENCE TO RELATED APPLICATIONS

This application claims the benefit of Korean Patent Application No. 10-2021-0058781, filed in the Korean Intellectual Property Office on May 6, 2021, which application is hereby incorporated herein by reference.

TECHNICAL FIELD

The present invention relates to a rear quarter vehicle body structure and an assembling method for the same. More particularly, the present invention relates to a rear quarter vehicle body structure in which a plastic composite material outer plate is bonded to a vehicle body and an assembling method for the same.

BACKGROUND

A smart factory is an innovative change in the production factory. It is an intelligent production factory that improves productivity, quality, and customer satisfaction by applying ICT (Information and Communication Technologies) combined with digital automation solutions in the production process such as design, development, manufacturing, distribution, and logistics. In other words, a smart factory refers to a factory that may control itself according to the purpose by collecting process data in real time by installing the Internet of Things (IoT) on equipment and machines in the factory, and analyzing it. Recently, as a light and flexible production system is required, it is emerging as a manufacturing innovation method.

In the vehicle industry, research on a smart factory with no three conditions without a vehicle body factory, a press factory, and a painting factory is being actively conducted.

In particular, the vehicle industry continues to invest in smart factories for technology to change steel outer panels, such as side outer panels and roof panels, into plastic composite materials.

In order to replace the steel outer plate with the plastic composite material outer plate, it is important to secure the joint surface because adhesive must be applied to the vehicle body without welding.

In order to bond the plastic composite material to the vehicle body, for example, it is necessary to remove the flange of the undercut part of the side outer panel, and a new vehicle body bonding structure is required by applying the filling structure.

Since the side outer panel and the vehicle body must be joined without mechanical bonding, it is important to secure the adhesive bonding quality, and it is required to set the adhesive friction structure minimization, that is, the loading direction and the bonding surface angle to be as close to 90 degrees as possible.

In addition, it is necessary to change the order of the assembly (welding process) of the existing side assembly due to the material change of the side outer panel, etc., and the plastic composite material side outer panel is required to secure a new sealing structure as a flange deletion structure is applied.

The above information disclosed in this Background section is only for enhancement of understanding of the background of the invention, and therefore it may contain information that does not form the prior art that is already known in this country to a person of ordinary skill in the art.

SUMMARY

Embodiments provide a rear quarter vehicle body structure and an assembling method for the same in which a plastic composite material outer plate is bonded to the vehicle body.

A rear quarter vehicle body structure according to an exemplary embodiment may include a quarter complete including a quarter pillar upper reinforcement, with a quarter complete outer welding surface formed in the outside direction of a vehicle body, and a side outer rear extension assembly including a side outer rear extension having a rear extension outer flange formed in an outer direction of the vehicle body, of which an inner surface of the rear extension outer flange is joined to the quarter complete outer welding surface.

A rear extension bonding surface may be formed on the exterior surface of the rear extension outer flange, and the rear quarter vehicle body structure may further include a side outer panel bonded to the rear extension bonding surface.

The rear extension bonding surface may include a rear extension first surface formed to the quarter pillar upper reinforcement direction, and a rear extension second surface inclined toward the rear of the vehicle body from the rear extension first surface.

The quarter pillar upper reinforcement may include an upper reinforcement bonding surface formed in the vehicle body length direction and bonded to the side outer panel.

The rear quarter vehicle body structure according to an exemplary embodiment may further include a roof side rail provided in the vehicle body length direction, and a roof side rail extension connecting the roof side rail and the quarter pillar upper reinforcement, wherein a roof side rail bonding surface and a roof side rail extension bonding surface may be formed on the roof side rail and the roof side rail extension along a front direction of the vehicle body from the upper reinforcement bonding surface, respectively.

The side outer rear extension assembly may include a side outer rear lower extension connected to the rear of the side outer rear extension, wherein a side outer rear lower extension bonding surface may be formed on the side outer rear lower extension toward the outside of the vehicle body from the rear extension second surface to the lower side of the vehicle body.

The side outer panel may include an outer panel joint surface protruding to be joined to the vehicle body.

The side outer panel may be bonded to the vehicle body by applying adhesive between the outer panel joint surface and the vehicle body.

The side outer panel may be made of plastic composite material.

The rear quarter vehicle body structure according to an exemplary embodiment may further include a sealer applied to the outside of the portion joined to the outer panel joint surface and the vehicle body.

An assembling method for a vehicle body according to an exemplary embodiment may include forming a vehicle body side portion by welding a side reinforcement complete including a roof side rail provided in the vehicle body length direction, a quarter complete including a quarter pillar upper reinforcement and of which a quarter complete outer welding surface is formed in the outside direction of a vehicle body, and a side outer rear extension assembly including a side outer rear extension of which a rear extension outer flange formed in an outer direction of the vehicle body, wherein the inner surface of the rear extension outer flange may be welded to the quarter complete outer welding surface.

The assembling method for a vehicle body according to an exemplary embodiment may further include bonding a side outer panel to the vehicle body side portion using an adhesive.

The vehicle body side portion may include a door portion, wherein the door portion bonding surface may be formed protrude in response to the outside of the door portion and an outer panel joint surface may be formed to protrude to be bonded to the side bonding surface of the vehicle body side portion including the exterior surface of the rear extension outer flange.

The vehicle body may further include a roof side rail extension connecting the roof side rail and the quarter pillar upper reinforcement, wherein the bonding surface of the vehicle body side portion may include a roof side rail bonding surface formed along the vehicle body length direction on the roof side rail, a roof side rail extension bonding surface formed along the vehicle body length direction on the roof side rail extension, and an upper reinforcement bonding surface formed in the vehicle body length direction on the quarter pillar upper reinforcement, wherein the side outer panel may be bonded using adhesive through the each bonding surface.

The bonding surface of the vehicle body side portion may include a rear extension first surface formed below the vehicle body on the upper reinforcement bonding surface, and a rear extension second surface inclined toward the rear of the vehicle body from the rear extension first surface, wherein the side outer panel may be bonded using adhesive at each bonding surface.

The side outer rear extension assembly may include a side outer rear lower extension connected to the rear of the side outer rear extension, wherein the bonding surface of the vehicle body side portion may further include a side outer rear lower extension bonding surface formed toward the outside of the vehicle body from the rear extension second surface downward, wherein the side outer panel may be bonded using adhesive at each bonding surface.

The side outer panel may be made of plastic composite material.

The assembling method for a vehicle body according to an exemplary embodiment may further include applying a sealer to the outside of the portion joined to the outer panel joint surface and the vehicle body side portion.

According to the rear quarter vehicle body structure and the assembling method for the same according to an exemplary embodiment, it may be joined using adhesive without welding work of the plastic composite material outer plate and the vehicle body, thereby simplifying the assembly process and reducing the vehicle body weight.

In addition, according to the rear quarter vehicle body structure and the assembling method for the same according to an exemplary embodiment, the bonding surface of the plastic composite material outer plate and the vehicle body is formed in the outer direction of the vehicle body to prevent adhesive rubbing when assembling the outer plate.

In addition, the effects obtainable or predicted by the embodiments are to be disclosed directly or implicitly in the detailed description of the embodiments. That is, various effects predicted according to an embodiment will be disclosed in the detailed description to be described later.

BRIEF DESCRIPTION OF THE DRAWINGS

Since these drawings are for reference in describing an exemplary embodiment of the present invention, the technical spirit of the present invention should not be construed as being limited to the accompanying drawings.

DETAILED DESCRIPTION OF ILLUSTRATIVE EMBODIMENTS

Figure 1:
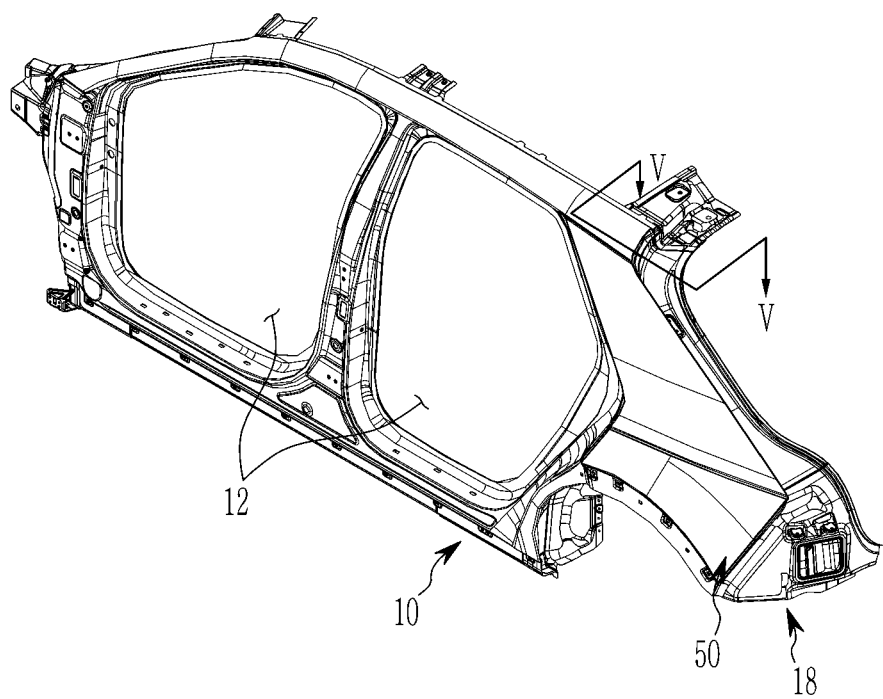
FIG. 1 is a perspective view of a vehicle body to which a rear quarter vehicle body structure according to an exemplary embodiment is applied.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to that shown in the drawings, and the thickness is enlarged to clearly express various parts and regions.

In addition, in the following detailed description, the names of the components are divided into first, second, etc., in order to classify the components in the same relationship, and the order is not necessarily limited in the following description.

Throughout the specification, when a part includes a certain component, it means that other components may be further included, rather than excluding other components, unless otherwise stated.

In addition, terms such as . . . part, . . . means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

An exemplary embodiment will hereinafter be described in detail with reference to the accompanying drawings.

Figure 2:
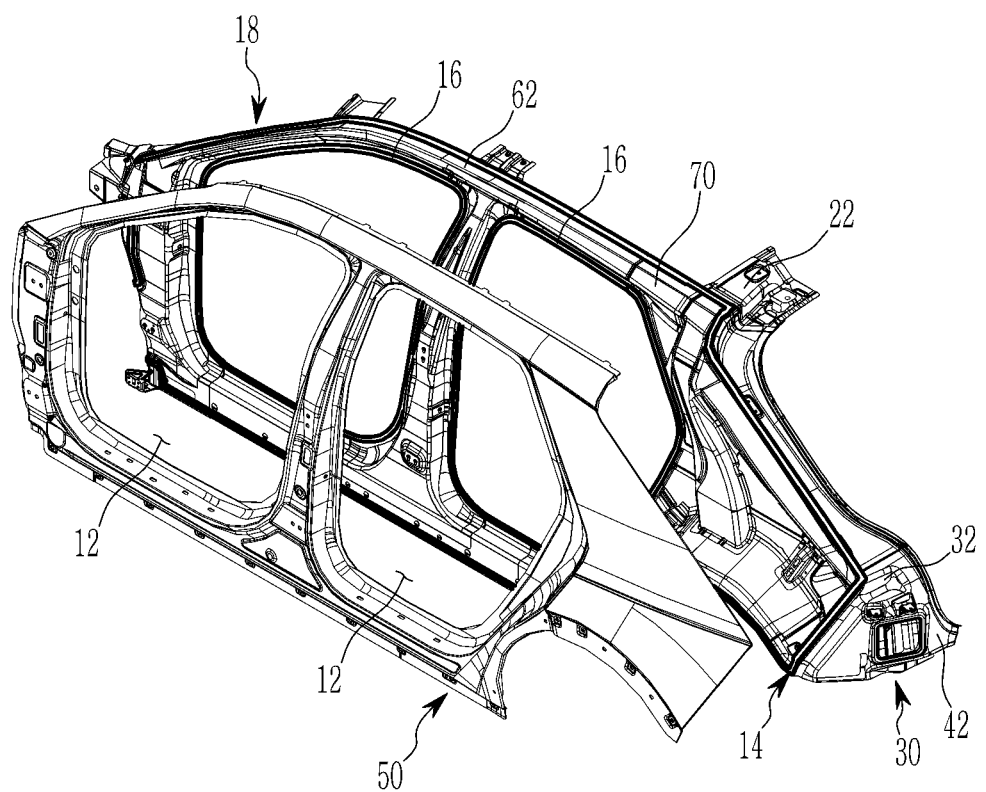
FIG. 2 is a partially exploded perspective view of the vehicle body to which the rear quarter vehicle body structure according to an exemplary embodiment may be applied.

FIG. 1 is a perspective view of a vehicle body to which a rear quarter vehicle body structure according to an exemplary embodiment may be applied, and FIG. 2 is a partially exploded perspective view of the vehicle body to which the rear quarter vehicle body structure according to an exemplary embodiment may be applied.

Referring to FIG. 1 and FIG. 2, a vehicle body 10 to which a rear quarter vehicle body structure according to an exemplary embodiment may be applied may include a vehicle body side portion 18 and a side outer panel 50 mounted on the vehicle body side portion 18.

The vehicle body side portion 18 may be formed of a metal material, and the side outer panel 50 may be formed of a plastic composite material.

Figure 3:
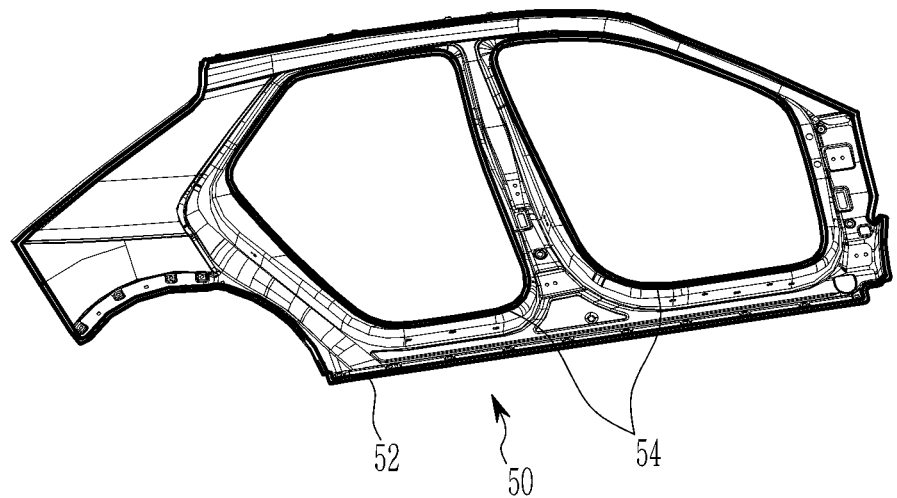
FIG. 3 is a perspective view of a side outer panel that may be applied to the rear quarter vehicle body structure according to an exemplary embodiment.

FIG. 3 is a perspective view of a side outer panel that may be applied to the rear quarter vehicle body structure according to an exemplary embodiment.

FIG. 3 denotes an inner part of the side outer panel 50, a drawing reference number 52 denotes an outer panel joint surface, and 54 denotes a door portion bonding surface, which will be described later.

Figure 4:
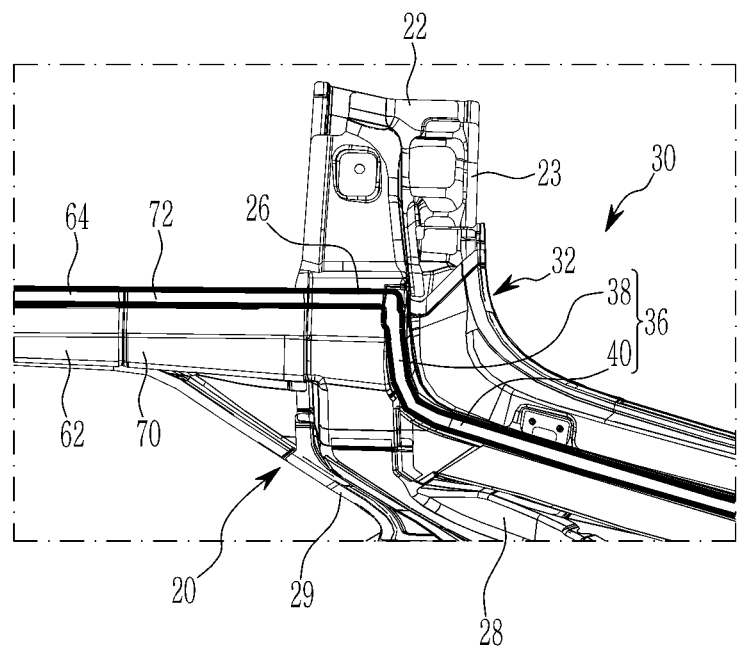
FIG. 4 is a partial perspective view of the quarter vehicle body structure according to an exemplary embodiment.
Figure 5:
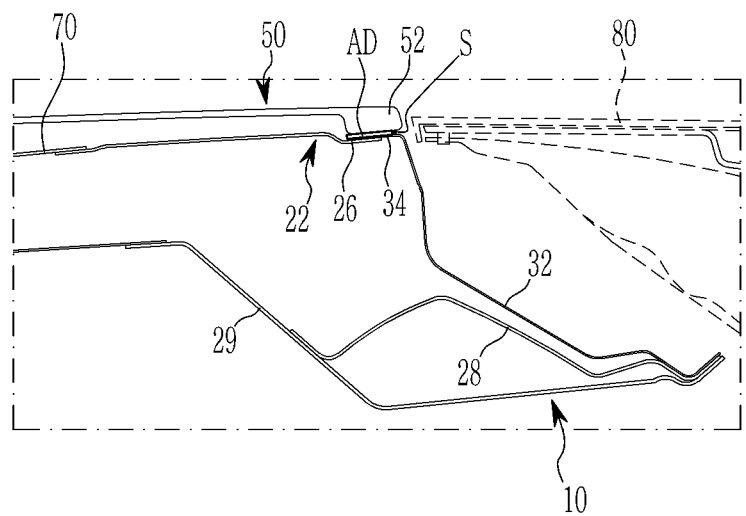
FIG. 5 is a cross-sectional view along line V-V of FIG. 1.

FIG. 4 is a partial perspective view of the quarter vehicle body structure according to an exemplary embodiment, and FIG. 5 is a cross-sectional view along line V-V of FIG. 1.

Referring to FIG. 1 to FIG. 5, the rear quarter vehicle body structure according to an exemplary embodiment may include a quarter complete 20 including a quarter pillar upper reinforcement 22, and a side outer rear extension assembly 30 including a side outer rear extension 32.

Figure 8:
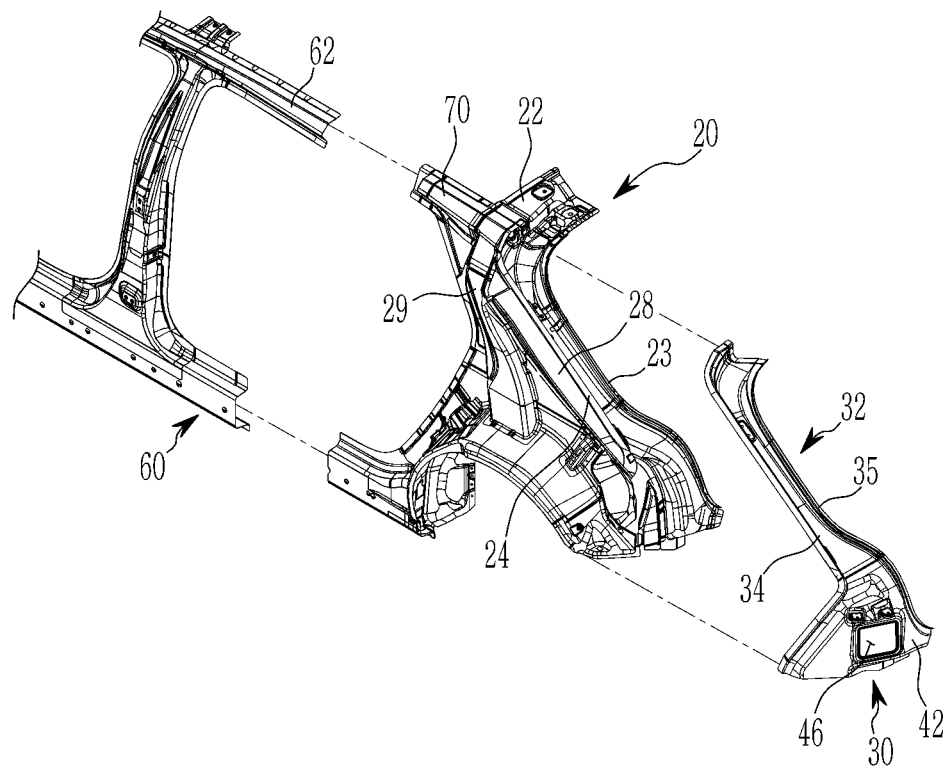
FIG. 8 and FIG. 9 are exploded perspective views of the vehicle body according to an exemplary embodiment of a vehicle assembling method.
Figure 9:
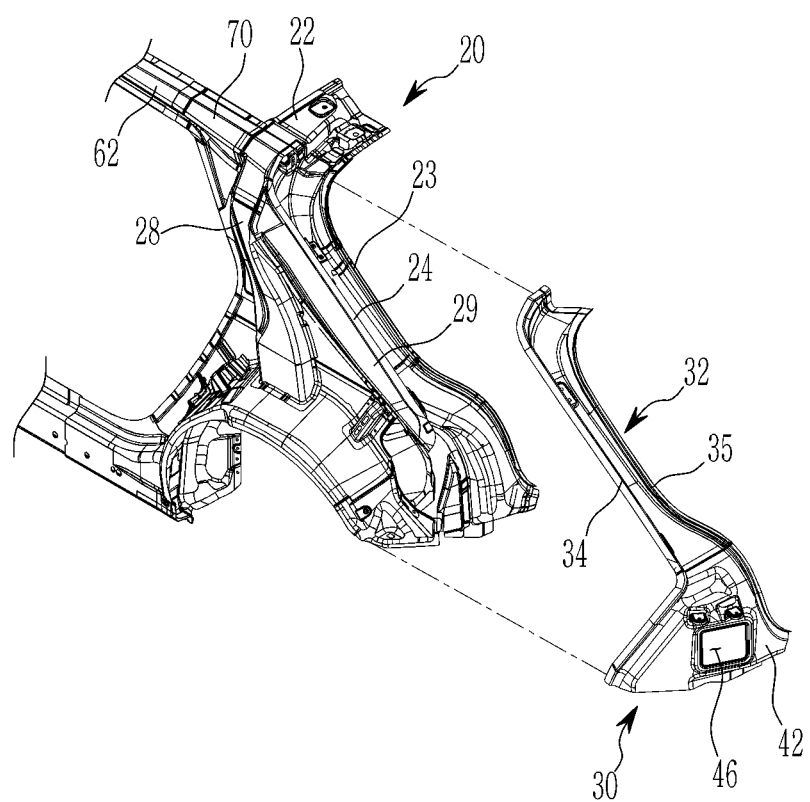

FIG. 8 and FIG. 9 is an exploded perspective view of the vehicle body to which the vehicle body assembling method according to an exemplary embodiment is applied.

Referring to FIG. 5 and FIG. 9, the side outer rear extension 32 includes a rear extension outer flange 34 formed in an outer direction of the vehicle body 10.

In the quarter complete 20, a quarter complete outer welding surface 24 is formed in the outer direction of the vehicle body 10, and the inner surface of the rear extension outer flange 34 is coupled to the quarter complete outer welding surface 24. The quarter complete outer welding surface 24 and the inner surface of the rear extension outer flange 34 may be joined by welding.

Referring to FIG. 4 and FIG. 8, a rear extension bonding surface 36 is formed on the exterior surface of the rear extension outer flange 34, and the side outer panel 50 may be connected to the rear extension bonding surface 36 by bonding.

The bonding surface may be defined as a surface joined to the side outer panel 50 with the adhesive AD (referring to FIG. 5). And the bonding surface is formed in the outside direction of the vehicle body 10, so that when the side outer panel 50 is bonded, it is possible to prevent the adhesive AD from being tilted.

Figure 6:
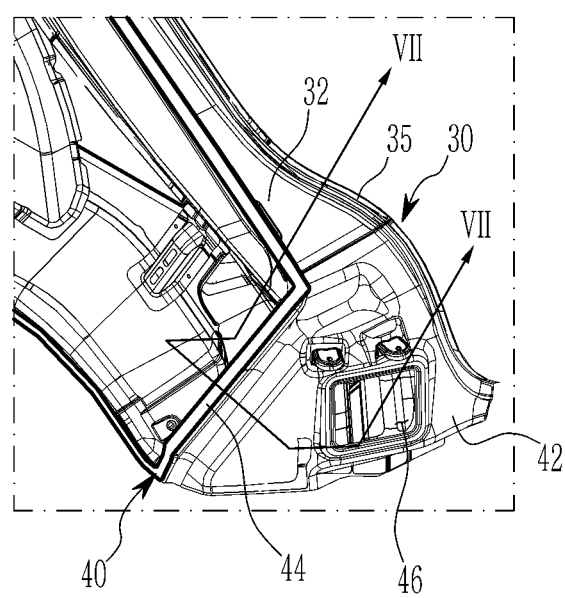
FIG. 6 is a partial perspective view of the rear part of the rear quarter vehicle body structure according to an exemplary embodiment.

Referring to FIG. 4 and FIG. 6, the rear extension bonding surface 36 may include a rear extension first surface 38 formed to the quarter pillar upper reinforcement 22 direction and a rear extension second surface 40 inclined toward the rear of the vehicle body 10 from the rear extension first surface 38.

The quarter pillar upper reinforcement 22 may include an upper reinforcement bonding surface 26 formed in the vehicle body 10 length direction and bonded to the side outer panel 50.

The rear quarter vehicle body structure according to an exemplary embodiment may further include a roof side rail 62 provided in the vehicle body 10 length direction, and a roof side rail extension 70 connecting the roof side rail 62 and the quarter pillar upper reinforcement 22. A roof side rail bonding surface 64 and a roof side rail extension bonding surface 72 may be formed on the roof side rail 62 and the roof side rail extension 70 along a front direction of the vehicle body 10 from the upper reinforcement bonding surface 26, respectively.

The roof side rail extension 70 may connect the roof side rail 62 and the quarter pillar upper reinforcement 22 to secure connectivity between members and form a load path. In addition, the roof side rail extension bonding surface 72 may form a bonding surface connected with the side outer panel 50 without breaking.

Figure 7:
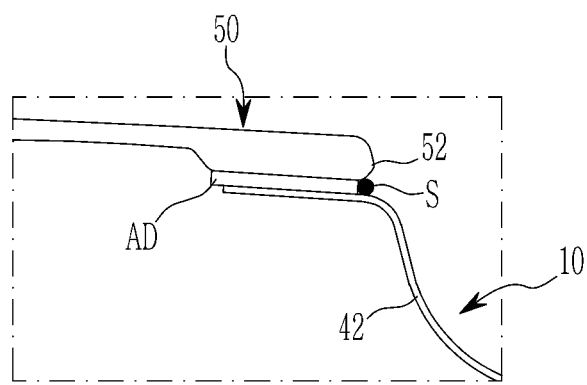
FIG. 7 is a cross-sectional view along line VII-VII of FIG. 6.

FIG. 6 is a partial perspective view of the rear part of the rear quarter vehicle body structure according to an exemplary embodiment, and FIG. 7 is a cross-sectional view along line VII-VII of FIG. 6.

Referring to FIG. 6 and FIG. 7, the side outer rear extension assembly 30 further includes a side outer rear lower extension 42 connected to the rear of the side outer rear extension 32, and a side outer rear lower extension bonding surface 44 may be formed on the side outer rear lower extension 42 toward the outside of the vehicle body 10 from the rear extension second surface 40 to the lower side of the vehicle body 10.

A bumper hole 46 is formed to the side outer rear lower extension 42 so that a bumper (not shown) may be mounted thereto.

The side outer rear lower extension bonding surface 44 is formed in a simple shape toward the outside of the vehicle body 10 under the vehicle body 10, so that it may be firmly bonded to the side outer panel 50 using adhesive.

As shown in FIG. 5 and FIG. 7, the side outer panel 50 may include an outer panel joint surface 52 protruded to be joined to the vehicle body 10.

The side outer panel 50 may be bonded to the vehicle body 10 by applying adhesive AD between the outer panel joint surface 52 and the vehicle body 10.

The protruded outer panel joint surface 52 may increase the strength of the bonding part, and the adhesive application and bonding work may be simplified.

The rear quarter vehicle body structure according to an exemplary embodiment may further include a sealer S applied to the outside of the portion joined to the outer panel joint surface 52 and the vehicle body 10.

The sealer S, together with the adhesive AD, provides a double sealing structure between the vehicle body 10 and the side outer panel 50.

Referring to FIG. 5 The rear quarter vehicle body structure according to an exemplary embodiment may further include a rear spoiler 80, and the rear spoiler 80 is mounted near the coupling position of the rear extension outer flange 34 and the outer panel joint surface 52.

The rear spoiler 80 may cover the coupling position between the rear extension outer flange 34 and the outer panel joint surface 52 to improve appearance and prevent foreign substances from entering the inside of the vehicle body 10.

Hereinafter, referring to FIG. 1 to FIG. 9, the vehicle body assembling method according to an exemplary embodiment will be described.

The vehicle body assembling method according to an exemplary embodiment includes forming the vehicle body side portion 18 by welding the side reinforcement complete 60 including the roof side rail 62 provided in the vehicle body 10 length direction, the quarter complete 20 including the quarter pillar upper reinforcement 22 and the quarter complete outer welding surface 24 formed in the outside direction of the vehicle body 10, and the side outer rear extension assembly 30 including the side outer rear extension 32 on which the rear extension outer flange 34 formed in the outer direction of the vehicle body 10 is formed.

That is, as shown in FIG. 8, and FIG. 9, after welding the side outer rear extension assembly 30 and the quarter complete 20, the side reinforcement complete 60 and the quarter complete 20 may be welded together, making it easier to manage parts. However, the bonding sequence is not limited thereto, and the side reinforcement complete 60 and the quarter complete 20 may be welded, and then the side outer rear extension assembly 30 and the quarter complete 20 may be welded. By the welding processes, as shown in FIG. 2, the vehicle body side portion 18 is formed.

As shown in FIG. 4 and FIG. 5, the quarter complete 20 includes a D pillar inner reinforcement 28 and a quarter inner lower extension 29, and before combining with the side reinforcement complete 60, the D pillar inner reinforcement 28 and the quarter inner lower extension 29, and the quarter pillar upper reinforcement 22 may be assembled.

As described above, the inner surface of the rear extension outer flange 34 may be welded to the quarter complete outer welding surface 24.

Referring to FIG. 8, the quarter complete 20 may further include a quarter complete inner flange 23 formed inside the vehicle body, the side outer rear extension assembly 30 may further include a rear extension inner flange 35, and the quarter complete inner flange 23 and the rear extension inner flange 35 may be welded together.

Then, the side outer panel 50 is bonded to the vehicle body side portion 18 of the vehicle body using adhesive AD.

As shown in FIG. 1 and FIG. 2, the vehicle body side portion 18 may include a door portion 12, and a vehicle body side bonding surface 14 and a vehicle body door portion bonding surface 16 may be formed on the vehicle body side portion 18.

As shown in FIG. 3, the door portion bonding surface 54 formed to correspond to the outside of the door portion 12, that is, the vehicle body door portion bonding surface 16 may protrude from the side outer panel 50 and the outer panel bonding surface 52 to be bonded to the side bonding surface 54 of the vehicle body side portion 18 may be formed to protrude from the side outer panel 50.

Referring to FIG. 7, although not shown, the door bonding surface 54 may also protrude like the outer panel bonding surface 52.

The outer panel joint surface 52 may be bonded to the side bonding surface 14 of the vehicle body side portion 18 including the exterior surface of the rear extension outer flange 34, as described above.

The vehicle body to which the vehicle body assembling method according to an exemplary embodiment is applied may further include the roof side rail extension 70 connecting the roof side rail 62 and the quarter pillar upper reinforcement 22. The bonding surface 14 of the vehicle body side portion 18 may include the roof side rail bonding surface 64 formed along length direction of the vehicle body 10 on the roof side rail 62, the roof side rail extension bonding surface 72 formed along the length direction of vehicle body 10 on the roof side rail extension 70, and the upper reinforcement bonding surface 26 formed along length direction of the vehicle body 10 on the quarter pillar upper reinforcement 22. And the side outer panel 50 may be bonded using adhesive AD through each bonding surface.

The bonding surface 14 of the vehicle body side portion 18 may further include the rear extension first surface 38 formed downward direction of the vehicle body 10 from the upper reinforcement bonding surface 26, and the rear extension second surface 40 inclined toward the rear of the vehicle body 10 from the rear extension first surface 38. And the side outer panel 50 may be bonded using adhesive AD through each bonding surface.

The side outer rear extension assembly 30 further includes the side outer rear lower extension 42 coupled to the rear of the side outer rear extension 32, and the bonding surface 14 of the vehicle body side portion 18 may further include the side outer rear lower extension bonding surface 44 formed toward the outside of the vehicle body 10 downwardly from the rear extension second surface 40.

As described above, the side outer panel 50 may be formed of a plastic composite material.

After the side outer panel 50 and the rear extension bonding surface 36 are bonded, a double sealing structure may be formed by applying the sealer S to the outside of the portion where the outer panel joint surface 52 and the vehicle body side portion 18 are joined.

As described above, according to the rear quarter vehicle body structure according to an exemplary embodiment, the plastic composite material outer plate may be bonded to the vehicle body using adhesive without welding work, simplifying the assembly process and reducing vehicle body weight.

In addition, according to the rear quarter vehicle body structure and its assembling method according to an exemplary embodiment, the bonding surface of the plastic composite material outer plate and the vehicle body is formed in the outer direction of the vehicle body to prevent adhesive rubbing when assembling the outer plate.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A rear quarter vehicle body structure comprising:
   a quarter complete comprising:
      a quarter pillar upper reinforcement comprising an upper reinforcement bonding surface formed in a vehicle body length direction and bonded to a side outer panel; and
      a quarter complete outer welding surface formed at an outside of a vehicle body; and
   a side outer rear extension assembly comprising a side outer rear extension having a rear extension outer flange formed at the outside of the vehicle body,
      wherein an inner surface of the rear extension outer flange is joined to the quarter complete outer welding surface,
      wherein a rear extension bonding surface is located on an exterior surface of the rear extension outer flange,
      wherein the rear extension bonding surface includes a rear extension first surface formed to the quarter pillar upper reinforcement and a rear extension second surface inclined toward a rear of the vehicle body from the rear extension first surface,
wherein the side outer panel is bonded to the rear extension bonding surface,
wherein the side outer panel comprises an outer panel joint surface joined to the vehicle body;
a roof side rail arranged in the vehicle body length direction; and
a roof side rail extension connecting the roof side rail and the quarter pillar upper reinforcement,
wherein a roof side rail bonding surface and a roof side rail extension bonding surface are formed on the roof side rail and the roof side rail extension along a front direction of the vehicle body from the upper reinforcement bonding surface, respectively.

2. The rear quarter vehicle body structure of claim 1,
wherein the side outer rear extension assembly comprises a side outer rear lower extension connected to the rear of the side outer rear extension, and
wherein a side outer rear lower extension bonding surface is formed on the side outer rear lower extension toward the outside of the vehicle body from the rear extension second surface to a lower side of the vehicle body.

3. The rear quarter vehicle body structure of claim 1, wherein the side outer panel is bonded to the vehicle body by applying an adhesive between the outer panel joint surface and the vehicle body.

4. The rear quarter vehicle body structure of claim 1, wherein the side outer panel is made of plastic composite material.

5. The rear quarter vehicle body structure of claim 1, further comprising a sealer arranged between the outer panel joint surface and the vehicle body.

6. A method for a assembling a vehicle body, the method comprising:
welding together a side reinforcement complete including a roof side rail provided in a vehicle body length direction, a quarter complete including a quarter pillar upper reinforcement and a quarter complete outer welding surface formed at an outside of the vehicle body, and a side outer rear extension assembly including a side outer rear extension comprising a rear extension outer flange formed at the outside of the vehicle body thereby forming a vehicle body side portion,
wherein a roof side rail extension connects the roof side rail and the quarter pillar upper reinforcement, and
wherein the vehicle body side portion comprises a door portion,
wherein an inner surface of the rear extension outer flange is welded to the quarter complete outer welding surface; and
bonding a side outer panel to the vehicle body side portion using an adhesive,
wherein an outer panel joint surface of the side outer panel is bonded to a side bonding surface of the vehicle body side portion and an exterior surface of the rear extension outer flange,
wherein the bonding surface of the vehicle body side portion comprises:
a roof side rail bonding surface formed along the vehicle body length direction on the roof side rail,
a roof side rail extension bonding surface formed along the vehicle body length direction on the roof side rail extension, and
an upper reinforcement bonding surface formed in the vehicle body length direction on the quarter pillar upper reinforcement, and
wherein the side outer panel is bonded using the adhesive at each bonding surface.

7. The method of claim 6,
wherein the bonding surface of the vehicle body side portion comprises:
a rear extension first surface formed below the vehicle body on the upper reinforcement bonding surface, and
a rear extension second surface inclined toward the rear of the vehicle body from the rear extension first surface, and
wherein the side outer panel is bonded using the adhesive at each bonding surface.

8. The method of claim 6,
wherein the side outer rear extension assembly comprises a side outer rear lower extension connected to the rear of the side outer rear extension,
wherein the bonding surface of the vehicle body side portion further comprises a side outer rear lower extension bonding surface formed toward the outside of the vehicle body from the rear extension second surface downward, and
wherein the side outer panel is bonded using adhesive at each bonding surface.

9. The method of claim 6, wherein the side outer panel is made of plastic composite material.

10. The method of claim 6, further comprising applying a sealer to the outer panel joint surface and the vehicle body side portion.

* * * * *

UNITED STATES PATENT AND TRADEMARK OFFICE
CERTIFICATE OF CORRECTION

PATENT NO. : 11,745,803 B2
APPLICATION NO. : 17/643043
DATED : September 5, 2023
INVENTOR(S) : Han et al.

Page 1 of 1

It is certified that error appears in the above-identified patent and that said Letters Patent is hereby corrected as shown below:

In the Claims

In Column 9, in Claim 6, Line 35, delete "for a" and insert -- for --.

Signed and Sealed this
Fifth Day of December, 2023

Katherine Kelly Vidal
*Director of the United States Patent and Trademark Office*